(12) United States Patent
Christensen

(10) Patent No.: US 6,498,333 B1
(45) Date of Patent: Dec. 24, 2002

(54) OPTICAL OBJECT DETECTOR WITH AUTOMATIC SENSITIVITY CONTROL

(75) Inventor: Timothy Alan Christensen, Camano Island, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/552,375

(22) Filed: Apr. 19, 2000

(51) Int. Cl.[7] ............................................. H01J 40/14
(52) U.S. Cl. ....................... 250/214 AG; 250/559.4; 250/559.29
(58) Field of Search .................... 250/214 AG, 221, 250/559.4, 559.33, 559.29, 208.2, 221.1, 216

(56) References Cited

U.S. PATENT DOCUMENTS 5,068,540 A * 11/1991 Tsuji ........................... 250/561
6,380,532 B1 * 4/2002 Christensen ................ 250/221

OTHER PUBLICATIONS

Opcon Application Note for Non–Contact Sensors, Feb. 1990.
Banner Specification sheet for QMT 42 Series Fixed Field Sensor (No date).
Eaton Installation Instructions for 6200 and 6210 Retroreflectors (No date).

* cited by examiner

Primary Examiner—Robert H. Kim
Assistant Examiner—Courtney Thomas
(74) Attorney, Agent, or Firm—George E. Haas; Quarles & Brady LLP

(57) ABSTRACT

An detection system emits a light beam and has a photodetector that senses when light is reflected by objects to be detected. Because reflectivity of the objects varies greatly, the intensity of the reflected light varies over a large range. To prevent false object detection, an automatic sensitivity control mechanism is provided which controls the intensity of the emitted light beam and attenuation of the signal from the photodetector. That control is in response to the level of the photodetector signal.

14 Claims, 4 Drawing Sheets

US 6,498,333 B1

OPTICAL OBJECT DETECTOR WITH AUTOMATIC SENSITIVITY CONTROL

BACKGROUND OF THE INVENTION

The present invention relates to utilizing a beam of light to detect the presence of objects, and more particularly to optical sensing equipment which employ a plurality of photodetectors to receive the light which has been reflected by an object to be detected.

In manufacturing operations, it is desirable to detect the presence of an object moving down a conveyor. This enables material handling equipment to direct the object safely between conveyor sections or to a work station. It also is desirable to detect when objects become jammed along the conveyor.

An optical detector system often is used for these purposes. One type of detection apparatus, referred to as a retro-reflective system places an emitter-detector assembly on one side of the conveyor and a reflector on the opposite side. A beam of light is sent from the emitter across the conveyor to the reflector and then returns back across the conveyor to the detector. An object, moving along the conveyor, interrupts the beam of light, thereby providing an indication of the presence of the object. Retro-reflective systems have the disadvantage of requiring installation of a reflector on the opposite of the conveyor. Installation of the reflector in many situations is difficult or interferes with other operations being performed along the conveyor. Therefore, it is desirable to utilize an object detector apparatus that does not require devices on both side of the conveyor.

In response, sensing systems have been developed which detect the reflection of the light beam from objects moving along the conveyor. However, such systems must address several potential problems. First, the reflectivity of the objects vary greatly from very specular in nature to ones that are very diffuse. In addition, black objects naturally absorb more light than white objects. The circuitry that processes the signal from the light detector can be designed with a relatively high sensitivity to detect low reflectivity objects. However, that high sensitivity often results in the signal processing circuitry being saturated in response to light from highly reflective objects.

In addition, high sensitivity sensing circuits can falsely respond to highly reflective objects on the opposite side of the conveyor. For example, a shiny metal object being transported on a cart next to the conveyor system can reflect enough light back to the photodetectors to be erroneously interpreted as an object moving down the conveyor. Therefore, it is desirable to have a detector system that has a relatively high sensitivity and a sharp cutoff at a distance equal to the far side of the conveyor.

FIG. 1 depicts a prior detection system of this type. In this system, an emitter 10 transmits a beam of light across the conveyor. One ray 12 of that light beam is illustrated passing through an output lens 14. An object 16 reflects the ray 12 through another lens 18 onto a detector assembly 20. The detector assembly 20 has an near detector 22 that receives light from objects which are relatively close to the detector assembly and has a far detector 24 that receives light from objects which farther away from the detector assembly. Note that the objects usually move in a direction that is orthogonal to the plane of the drawing. The farther an object is from the emitter 10 the smaller the angle of the reflected ray 12. For example, the reflected beam from object 16 strikes the near detector 22, whereas the reflected ray from a more distant object 26, beyond a given cutoff distance 28 from the emitter, strikes the far detector 24 and not the near detector 22.

It should be understood that the emitter 10 produces a beam of radiation comprising numerous rays. Thus, when the entire beam is reflected from an object, some of the rays may strike the near detector 22 and other reflected rays may strike the far detector 24. If the object is within the cutoff distance 28 from the emitter, a greater amount of reflected light will strike the near detector 22 than the far detector 24. Conversely, when the object is beyond the cutoff distance 28, a greater amount of light is reflected onto the far detector 24 than onto the near detector 22. The output signal produced by a detector corresponds to the amount of light which impinges that detector. Thus, by comparing the two detector signals, the object detection apparatus is able to distinguish an object moving along the conveyor from objects beyond the conveyor.

This dual detector system does well when a diffuse object fully blocks the beam of light from the emitter. However, when an out of range object blocks only a portion of the emitted beam or is specular, light from that out of range object can be falsely interpreted as being from an object on the conveyor because the near detector 22 may receive more light than the far detector 24.

SUMMARY OF THE INVENTION

An object detection system according to the present invention has an automatic sensitivity control mechanism that adjusts the photodetector signal processing to account for objects of vastly different reflectivities.

This object detection system has an emitter which produces a light beam that will be reflected by objects to be detected. The emitter is connected to an output terminal of and control circuit which produces an electric current that varies in magnitude in response to a first control signal.

A photodetector receives light that has been reflected by an object and produces a signal indicating the amount of light which strikes the photodetector. A variable attenuator is connected to the photodetector to attenuate the signal by an amount that varies in response to a second control signal.

The amounts of emitter current and attenuation are determined by a controller. The controller receives the signal produced by the photodetector and compares that signal to one or more threshold levels to determine amounts of emitter current and attenuation. The first and second control signals are generated by the controller in response to that determination.

DETAILED DESCRIPTION OF THE INVENTION

Figure 1:
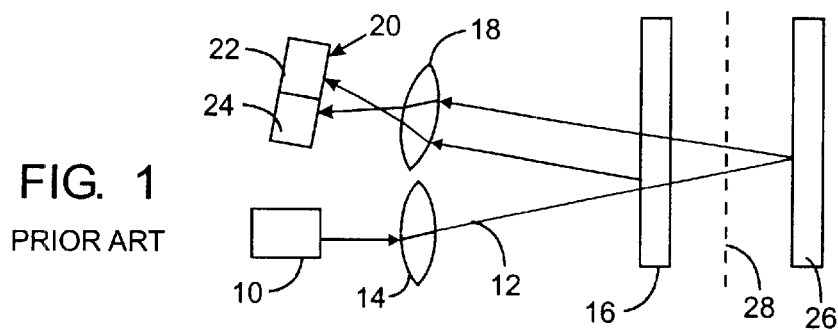
FIG. 1 is a schematic representation of an object detector according to the prior art.
Figure 2:
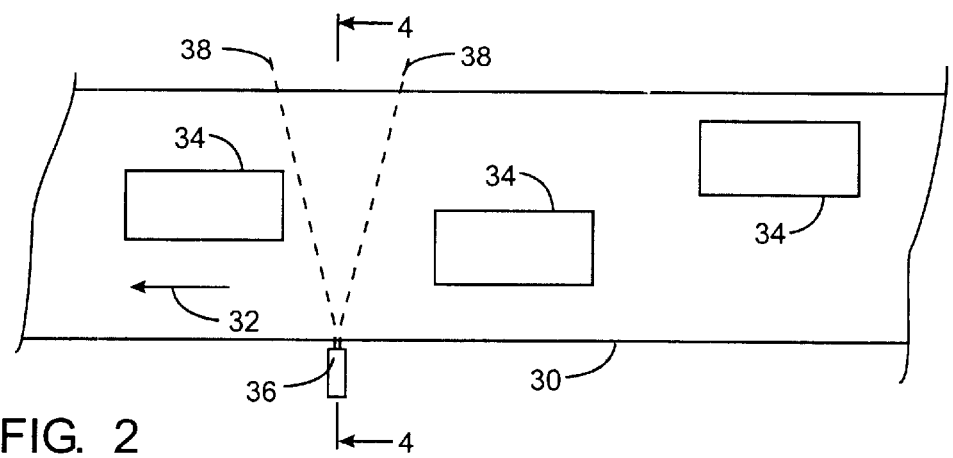
FIG. 2 illustrates a conveyor on which the present object detection system is located.

With initial reference to FIG. 2, a conveyor 30 travels in the direction indicated by arrow 32 and carries a plurality of objects 34. An optical object detection system 36 is located on one side of the conveyor 30 and has a horizontal field of view with boundaries indicated by dashed lines 38. As will be described, the object detection system 36 emits a beam of light across the conveyor 30 which is reflected as each object 34 passes within the field of view. The reflected light strikes one or more of three photodetectors within the system 36.

Figure 3:
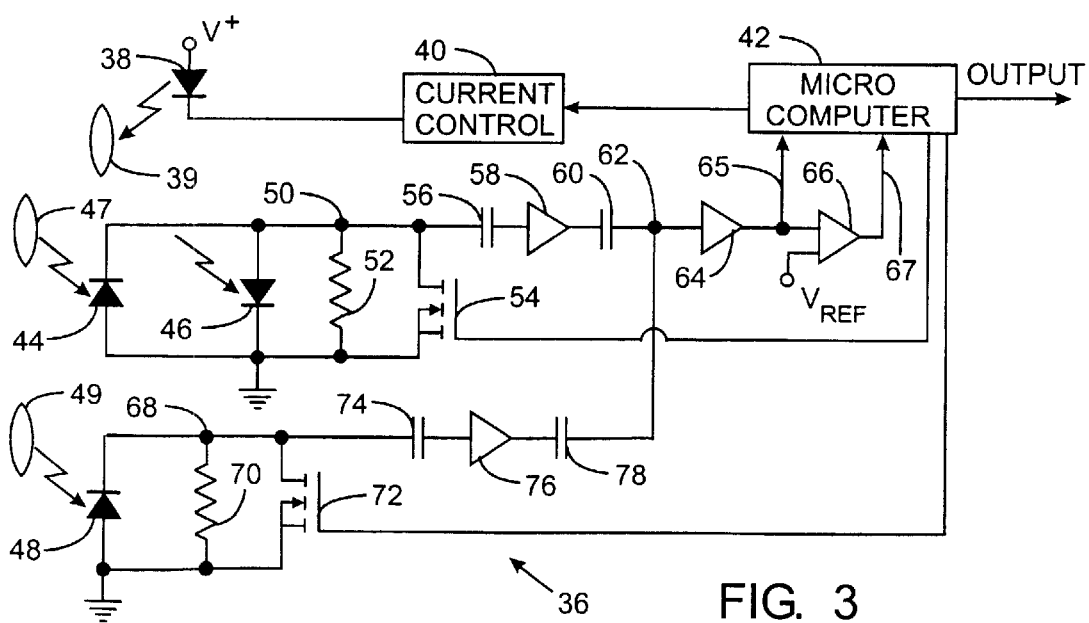
FIG. 3 is a schematic circuit diagram of the object detection system.

FIG. 3 illustrates the details of the object detection system 36 which includes a light emitter 38, such as a light emitting diode. The intensity of the light from the emitter 38 is a function of the magnitude of the electric current flowing through the device. Thus emitter 38 is connected to a current control circuit 40 which varies the magnitude of that electric current in response to a command signal received from a microcomputer 42. The microcomputer 42 is a conventional device having digital and analog inputs and outputs. An internal memory stores the program which is executed to provide the object detection function.

As will be described, the light from the emitter 38 is reflected by the objects 34 and strikes one or more of three photodetectors 44, 46, and 48. The first and second photodetectors 44 and 46 are connected in inverse parallel manner between the circuit ground and a first input node 50. The photodetectors 44–48 emit an electric current upon being illuminated.

Current produced by the first and second photodetectors 44 and 46 is conducted through a current sensing resistor 52 and a first field effect transistor (FET) 54 which are connected in parallel between a first input node 50 and circuit ground. A voltage is produced at the first input node 50 which corresponds to the magnitude of that current. Because the first and second photodetectors 44 and 46 are poled in opposite directions in the circuit, the voltage level at first input node 50 corresponds to the difference in the amount of the light striking the first and second photodetectors 44 and 46. The polarity of that voltage indicates whether more light is striking the first detector 44 or the second detector 46. Specifically, the voltage at node 50 is positive with respect to ground when more light strikes the second photodetector 46, whereas that voltage is negative with respect to circuit ground when more light strikes the first photodetector 44.

The gate of the first FET 54 is connected to by an analog output of the microcomputer 42. As will be described, the first FET 54 acts as a variable resistor which the alters the total resistance through the which the photodetector current flows. For example, the FET 54 in the off-state can be characterized as a one megaohm resistor, while in the on-state FET has a resistance of approximately two ohms or less. Thus, the microcomputer 42 by varying the voltage applied to gate of the FET 54 can vary the attenuation of the photodetector signal and the sensitivity of the system.

The resultant signal produced at first input node 50 is coupled by a capacitor 56 to a first pre-amplifier 58 having an output that is coupled by a second capacitor 60 to a summing node 62 at the input of a high gain amplifier 64. The analog output from amplifier 64 is applied to an analog input 65 of the microcomputer 42 and to one input of a comparator 66 having another input connected to a reference voltage $V_{REF}$. The output of the comparator 66 is applied to a digital input 67 of the microcomputer.

The third photodetector 48 is connected between circuit ground and a second input node 68. A second current sensing resistor 70 and a second field effect transistor (FET) 72 are connected in parallel with the third photodetector 48. The gate of the second FET is controlled by a second analog output of the microcomputer 42. When light strikes the third photodetector 48 a proportional negative voltage is produced at the second input node 68. The second input node 68 is coupled by capacitor 74 to a second pre-amplifier 76 having an output coupled by another capacitor 78 to the summing node 62.

Figure 4:
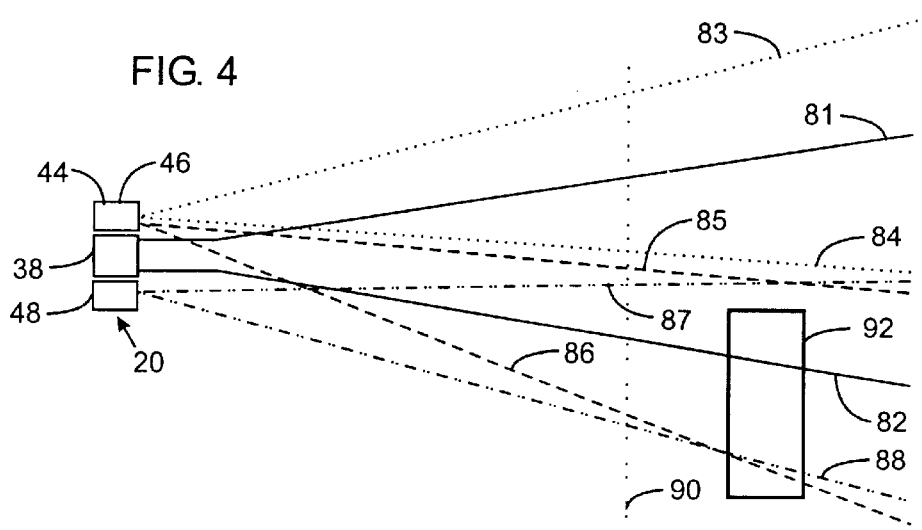
FIG. 4 is a view taken along line 4—4 of FIG. 2 illustrating the fields of view for each of the three photodetectors used in the object detection system.

Important to operation of the object detection system 36 is the aiming the three photodetectors 44, 46, and 48 with respect to the conveyor 30. That aiming is shown in FIG. 4. The emitter 38 produces a generally conical beam of radiation with the upper and lower boundaries of that beam being depicted by the solid lines 81 and 82 respectively. The first and second photodetectors 44 and 46 are mounted above the emitter 38 with the first detector 44 having a field of view with upper and lower boundaries 83 and 84, respectively, are indicated by dotted lines. Note that the lower boundary 84 passes into the emitter's light beam and the upper boundary 83 extends considerably above the upper boundary 81 of that light beam. The second photodetector 46 has a field of view with upper and lower boundaries 85 and 86 depicted by dashed lines. The upper boundary 85 extends through the emitter's light beam crossing the midpoint of that beam at approximately a point corresponding to the cutoff distance 90. The lower boundary 86 extends beneath the beam of radiation across the conveyor. The fields of view for the first and second photodetectors do not insect. The cutoff distance corresponds to the opposite side of the conveyor 30 from the detection system 36. As will be described, the system does not respond to light reflected by objects that are beyond the cutoff distance 90.

The field of view for the third photodetector 48 is defined by upper and lower boundaries 87 and 88. It is important that the lower boundary 88 of that field of view does not cross the lower boundary 82 of the light beam from emitter 38. Otherwise there is an opportunity that the second detector 46 could be the only one receiving light which would result an erroneous output from the object detection system 36. Note that the upper boundary 87 of the third photodetector's field of view crosses the upper boundary of the field of view for second photodetector 46, but does so beyond the distance cutoff line 90.

As shown in FIG. 3, the inverse parallel connection of the first and second photodetectors 44 and 46 results in the output current from the first photodetector 44 being subtracted from the output signal of the second photodetector. The resultant current flows through the sensing resistor 52 and produces a voltage at first input node 50 corresponding to the level of that resultant current. If more light impinges on the first photodetector 44 than on the second photodetector 46, the first photodetector will produce a greater signal resulting in a negative voltage being produced at first input node 50 with respect to ground. When a greater amount of light strikes the second photodetector, the resultant current produces a positive voltage at first input node 50. The voltage produces at first input node 50 produces a proportional output signal from the first pre-amplifier 58, which is applied to the summing node 62 by coupling capacitor 60.

The intensity of light striking the third photodetector 48 produces a corresponding negative voltage at the second input node 68. In response, the second pre-amplifier 76 produces a proportional negative signal at its output which is coupled to the summing node 62. As a result, the signal level at the summing node 62 arithmetically equals the output signal from the second photodetector 46 minus the output signal from the first photodetector 44 and minus the output signal from the third photodetector 48. The arithmetic signal summation at node 62 is amplified by the high gain amplifier 64 and applied to the analog input 65 of the microcomputer 42. The output signal from the high gain amplifier 64 is compared to the detection threshold $V_{REF}$ by comparator 66 to determine whether the output signal is above that referenced threshold. The digitized bit from that comparison is then applied to a digital input of the microcomputer 42.

The alignment of the fields of view for the three photodetectors 44–48, as shown in FIG. 4, are such that when an object is between the emitter 38 and the cutoff distance 90, the second emitter 46 will produce a signal that is significantly greater than the combination of the signals from the first and second detectors 44 and 48. Therefore, the amplified sum of the three detector signals applied to the comparator 66 exceeds the detection threshold $V_{REF}$. As a consequence, a true logic level will be applied to the digital input 67 of the microcomputer 42 thereby indicating the presence of an object on the conveyor 30.

When the light from emitter 38 is reflected by an object that is farther away from the emitter than the cutoff distance 90, the combination of the negative signals from the first and second photodetectors 44 and 48 will be greater than the positive signal from the first photodetector 46. As a consequence, the sum of the detector signals at node 62 when amplified by amplifier 64 will be less than the detection threshold $V_{REF}$. As a consequence, the output from the comparator 66 will be a fault logic level which gets applied to the digital input 67 of the microcomputer 42. Thus, the microcomputer will not respond to objects beyond the cutoff distance 90.

FIG. 4 illustrates the robust nature of the present three photodetector system. Assume that a nonuniform object 92 passes on the far side of the conveyor 30 from the sensing assembly 20. This object 92 does not reflect light into the first photodetector 44, which field of view is indicated between boundaries 83 and 84, but, this nonuniform object does reflect some light into the second photodetector having a field of view indicated by boundary lines 85 and 86. As a consequence, a positive voltage will be produced at the first input node 50.

However, with the present system that incorporates a third photodetector 48, the nonuniform object 92 reflects light into the third photodetector's field of view bounded by lines 87 and 88. Thus a negative voltage is produced at the second input node 68 which causes the second pre-amplifier 76 to apply a negative voltage to summing node 62 in FIG. 3. The negative voltage is greater than the positive voltage from the first pre-amplifier 58. Therefore, a negative voltage level is produced at summing node 62, thereby resulting in a voltage being applied to an input to the comparator 66 which is less than the detection threshold $V_{REF}$. Thus a false logic level is sent to the digital input 67 of the microcomputer 42 indicating that an object is not present on the conveyor.

Although the three detector system is a significant improvement over the detector systems with only a pair of photodetectors, it is possible that a mirror located beyond the cutoff distance 90 could reflect light onto only the second detector 46. This would provide a false input to the microcomputer 42 as though an object had been detected on the conveyor. Although the angle at which light could be reflected to produce that false detection is very small, there is still the possibility for that occurrence.

Figure 5:
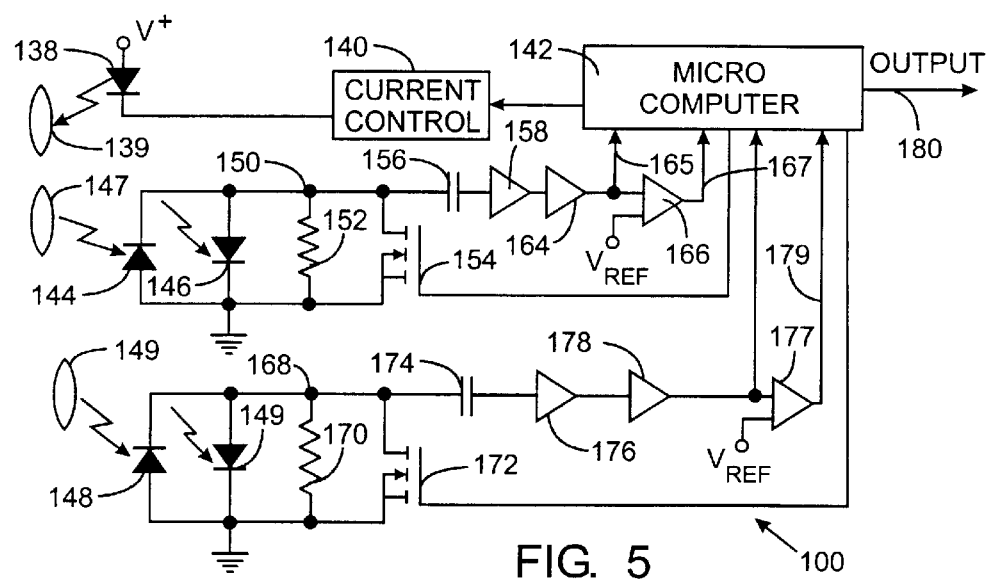
FIG. 5 is a schematic diagram of a second embodiment of the present invention which utilizes four photodetectors.

In applications where a high degree of reliability is required, a fourth photodetector can be provided adjacent to the third photodetector thus providing two photodetectors on each side of the emitter. With reference to FIG. 5, object detection system 100 is similar to the previously described three photodetector system 36. Specifically, a light emitter 138 is coupled to the output of a current control circuit 140 that varies electric current fed through the emitter in response to the signal from the microcomputer 142.

First and second photodetectors 144 and 146 are connected in inverse parallel fashion between the circuit ground and a first sensing node 150. A first current sensing resistor 152 and a first FET 154 are connected in parallel with the photodetectors 144 and 146. The first sensing node 150 is coupled by capacitor 156 to the input of a first pre-amplifier 158 whose output is connected directly to the input of a first amplifier 164. The output of first amplifier 164 is connected to a first analog input 165 of the microcomputer 152 and to an input of a first comparator 166. The first comparator 166 has another input connected to a source of the detection threshold $V_{REF}$. The output of the first comparator 166 is applied to one bit line 167 of a digital input to the microcomputer 142.

The third and fourth detectors 148 and 149 are similarly connected in an inverse parallel manner between the circuit ground and a second sensing node 168. A second current sensing resistor 170 and second FET 172 are connected in parallel with the third and fourth photodetectors 148 and 149. The microcomputer has separate analog output lines connected to the gates to the two FETs 154 and 172. The second current sensing node 168 is coupled by a capacitor 174 to the input of a second pre-amplifier 176 whose output is applied to the input of a second amplifier 178. The output of the second amplifier 178 is applied to a second analog input 175 of the microcomputer 142 and to an input of a second comparator 177. The second comparator has another input connected to the detection threshold $V_{REF}$. The output of the second comparator 177 is applied to another bit line input 179 of the digital input for the microcomputer 142.

Figure 6:
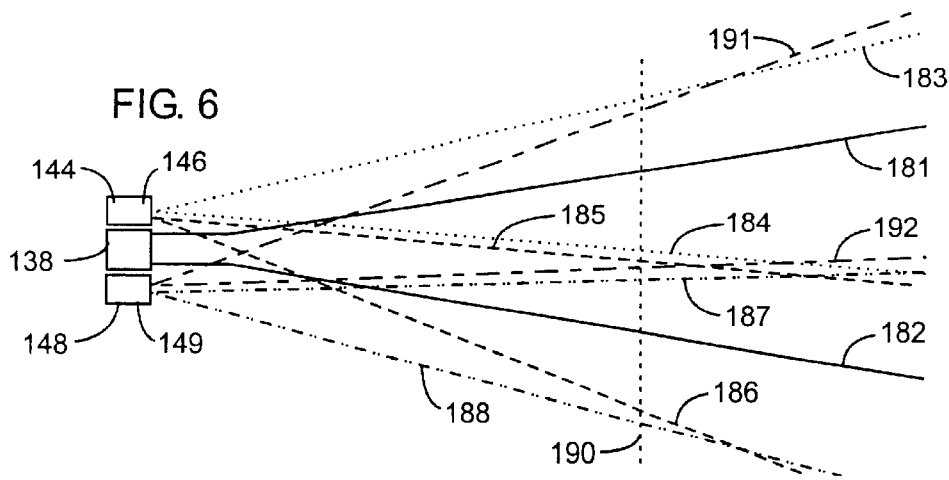
FIG. 6 depicts the fields of view for each of the four photodetectors in the circuits of FIG. 5.

With reference to FIG. 6, the light emitter 138 and its associated lens 139 are adjusted to produce a beam pattern with the upper and lower boundaries 181 and 182. The first and second photodetectors 144 and 146 and their common lens 147 are aimed to have fields of view as indicated by the dotted and dashed lines in the drawing. Specifically, the field of view for the first photodetector 144 has an upper boundary 183 extending upwardly across the conveyor 30. The lower boundary 184 for the field of view of the first photodetector 144 extends downward, but does not cross the center line of the light beam from emitter 138 until well beyond a cutoff distance 190. The upper boundary 185 for the field of view of the second photodetector 146 extends at an angle slightly downward from the lower boundary 184 of the first photodetector 144 and does not cross that lower boundary. The lower boundary 188 for the second photodetector's field of view extends downward across the conveyor. The fields of view for the first and second photodetectors do not insect.

The field of view for the third photodetector 148 has an upper boundary 187 which extends upward but does not cross the center line of the light beam from emitter 138 until well beyond the cutoff distance 190. The lower boundary 188 of the third photodetector's field of view extends downward and does not cross the lower boundary 182 of the emitter's light beam. The fourth photodetector 149 has a field of view with a lower boundary 192 which extends upward into the light beam from emitter 138, but does not cross the center line of that beam until well beyond the cutoff distance 190. The upper boundary 191 of the field of view for the fourth photodetector 149 extends upward and crosses the upper boundary of the first photodetector 144 slightly beyond the cutoff distance 190. The fields of view for the third and fourth photodetectors do not insect.

The configuration of the fields of view for the various photodetectors and their arrangement in the processing circuitry of FIG. 5 are such that when an object passes along the conveyor (i.e. between emitter 138 and cutoff distance 190) the microcomputer receives a pair of true signals from the first and second comparators 166 and 177. Specifically, in this situation the light impinging upon the second photodetector 146 will be greater than the light impinging upon the first photodetector 144, thus producing a correspondingly greater signal from the second photodetector 146. This results in a positive voltage being produced at the first sensing node 150 resulting in the first comparator 166 applying a true logic level to digital input line 166 of the microcomputer. That object on the conveyor also reflects a greater amount of light onto the fourth photodetector 149 than onto the third photodetector 148. This similarly produces a positive voltage at the second sensing node 168 and in turn a true signal from the second comparator 177 on the second digital input line 179 of the microcomputer. Thus, when an object is within the cutoff distance 190 from the emitter 138, the microcomputer receives a pair of true logic levels on input lines 167 and 179.

When an object beyond the opposite side of the conveyor from the object detection system 36 reflects light onto the photodetectors 144–149 at least one of the comparators 166 and 177 produces a false output signal. Thus, if either or both comparator output signals is false, a low logic level, the microcomputer 142 determines that there is not a valid object passes on the conveyor 30.

As noted with respect to the three photodetector system in FIGS. 3 and 4, a specular object on the remote side of the conveyor 30 can reflect a light from the emitter 38 directly back to only the second photodetector 146. That event generates a false object detection output from the microcomputer 42. A similar object can reflect light from the emitter directly back to either the second or third photodetectors 146 or 149 in the four detector system in FIGS. 5 and 6. However, because that reflected beam from the out of range specular object has a very narrow return angle, the reflected light beam can not strike both the second and fourth photodetectors 146 and 149. As a consequence, a positive voltage can occur at only one of the input nodes 150 or 168 and a true logic level is produced by only one of the two comparators 166 or 177. Since the other comparator has a false output, the microcomputer 142 receives only one true logic level on digital input lines 167 and 179 and will not falsely conclude that there is an object present on the conveyor line. Therefore, the four photodetector version is more robust in guarding against false object detections.

Figure 7A:
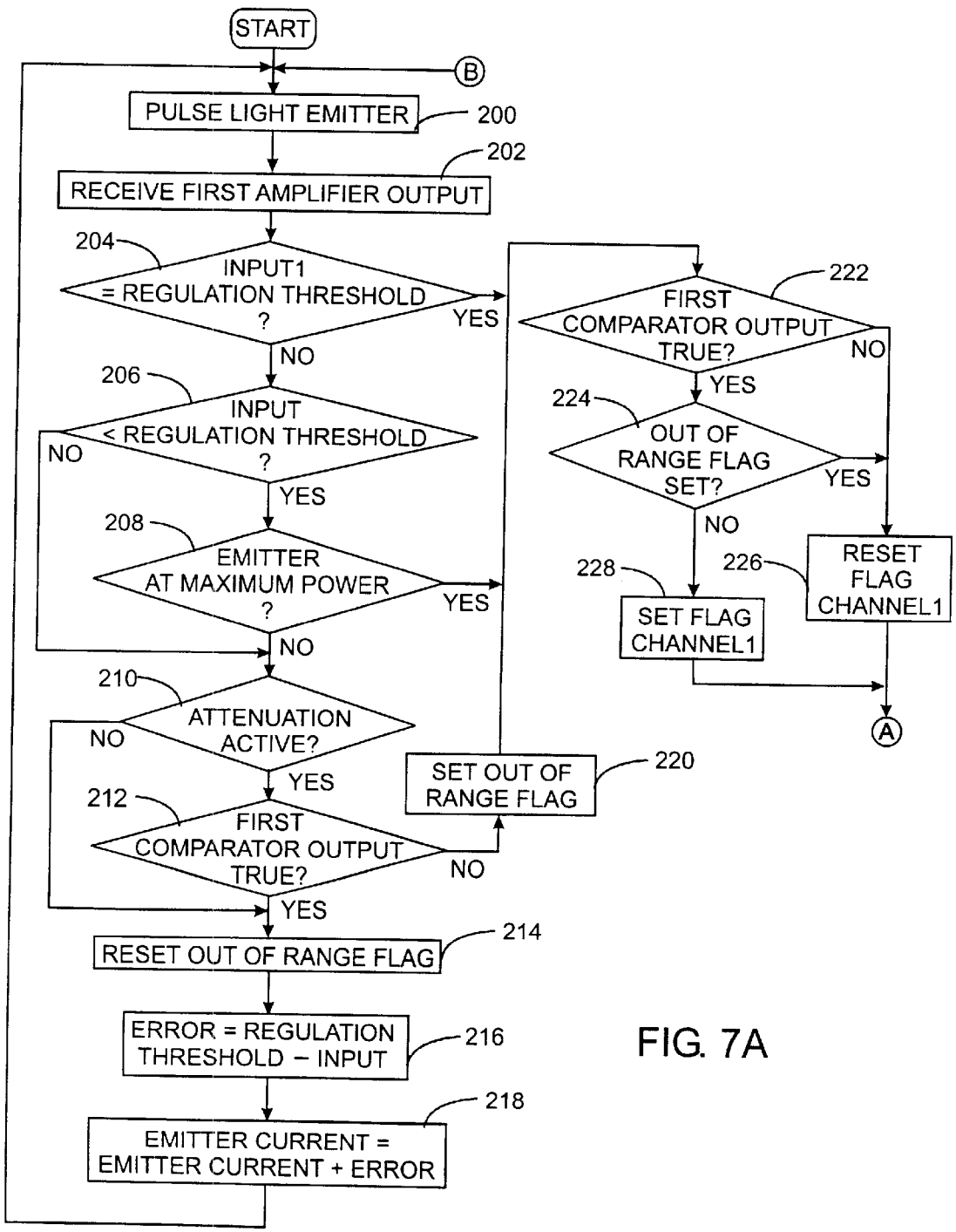
FIGS. 7A and 7B form a flowchart of the operation of the second embodiment.

The second object detection system 100 also provides automatic sensitivity control which is best described in the context of the flowchart commencing on FIG. 7A. The software execution commences at step 200 where the microcomputer 142 issues a digital command that instructs the current control circuit 140 to apply current pulse a previously determined level to the emitter 138. A variable indicating that level of current is stored within the memory of the microcomputer 142, which also contains a default level to be used upon initial power-up of the system. The current results in the emitter 138 producing a pulse of light which travels across the conveyor system.

At step 202, microcomputer 142 receives data from the first amplifier 164 at the first analog input 165. The level of that analog signal is digitized and then compared at step 204 to a regulation threshold which corresponds to the desired intensity of the light beam from the emitter 138. If the light beam has the desired intensity, the program execution bypasses the automatic sensitivity control section by entering branch 205.

If the light beam is not at the desired intensity, a determination is made at steps 206 and 208 whether both the input from the first amplifier 164 is less than the regulation threshold and the emitter is at maximum intensity. If that logical expression is true, the automatic sensitivity control routine also is bypassed by entering branch 205. If that logical expression is not true, the program execution advances to step 210.

The automatic sensitivity control section commences at step 210 with a determination whether or not the input attenuation is active. Relatively fine control of the sensing circuitry is accomplished by regulating the current applied to the emitter 138. Coarser control is performed by attenuating the input signals from the photodetectors 144–149 via activation of the first and second FETs 154 and 172 in unison. Activation of the FETs may either be binary (off or on), or a variable voltage can be applied to the gates of the FETs to provide a varying amount of attenuation. In the binary mode, the gates of the FET are connected to the most significant bit of the microcomputer's digital output connected to the current control circuit 140. The remaining bits, but not the most significant bit, are connected to the current control circuit 140.

The input to the current control circuit 140 is based negative logic wherein the greater the numerical value of the digital input from the microcomputer 142, the smaller the amount of current applied to the emitter. As a consequence, when the most significant bit of that digital output is set, is a one value (for half the values), both FETs 154 and 172 are turned-on, thereby providing a relatively low resistance path in parallel with the sensing resistors 152 and 170. This reduces the voltage levels at the sensing nodes 150 and 168, thereby providing greater attenuation of the signals produced by the photodetectors. Additional fixed resistor (not shown) can be connected in series with each FET 154 and 172 to set the level of the binary attenuation.

The default emitter current setting is in the lower half of the digital values for the current control circuit 140. Therefore, the FETs 154 and 172 will be off, nonconductive. When the automatic sensitivity control process increased that digital value to the midpoint, the most significant bit is set to one and the remaining bits are zeroes. This turns on the FETs 154 and 172 activating photodetector attenuation. Because the remaining bits are zeroes, the level of current to the emitter will be at maximum level. From that point, incrementation of the remaining digital bits reduces the emitter current.

As a result of this control strategy, the microcomputer 142 determines at step 210 whether the most significant bit of the data for the current control circuit 140 is set. If that is not the case, the program execution jumps to step 214. However, when attenuation is active, the program execution branches to step 212 at which the microcomputer 142 inspects its first digital input line 167 for a true output from the first comparator 166. That input is true when the combined signals from the first and second photodetectors 144 and 146 produce a substantial positive voltage level at the first input node 150, as occurs when an object is present on the conveyor in front of the object detection system 100. If the comparator output is false, an OUT OF RANGE flag is reset at step 220 to indicate that a highly reflective object is located out of the range of the sensing system, i.e. beyond the cutoff distance 190. In that case, the sensitivity of the system can not be adjusted and the programs goes to step 222.

However, if the output of the first comparator 166 is true at step 212, the OUT OF RANGE flag is reset at step 214. Next at step 216, the level of the signal at the first analog input 165 is subtracted from the regulation threshold which indicates the desired intensity for the emitter beam, That calculation produces an ERROR value that then is added to the previous value for the emitter current to produce a new value for the emitter current at step 218. The program execution then returns to step 200 to produce another pulse of light in order to check the performance of the system at the newly determined value for the emitter current. Eventually a determination is made either at step 204 that the emitter current has been properly set or at step 208 that no further adjustment of the emitter power is possible and the program execution advances to step 222.

At this point the signals from the first and second photodetectors 144 and 146 are inspected for an indication that an object is present on the conveyor. Specifically, if the binary output of the first comparator 166 appearing on input line 167 is false, a flag called "CHANNEL1" is reset at step 226 to indicate that an object was not found. However, if the output of the first comparator 166 is true, a determination is made at step 220 for whether the OUT OF RANGE flag is set. If that is the case, the true comparator output resulted from a specular object beyond the cutoff distance 190 and the CHANNEL1 flag is reset to indicate that an object is not present on the conveyor. Alternatively, when the first comparator output is true and the OUT OF RANGE flag is not set, the CHANNEL1 flag is set at step 228 to indicate that the first and second photodetectors 144 and 146 may have detected a valid object.

Figure 7B:
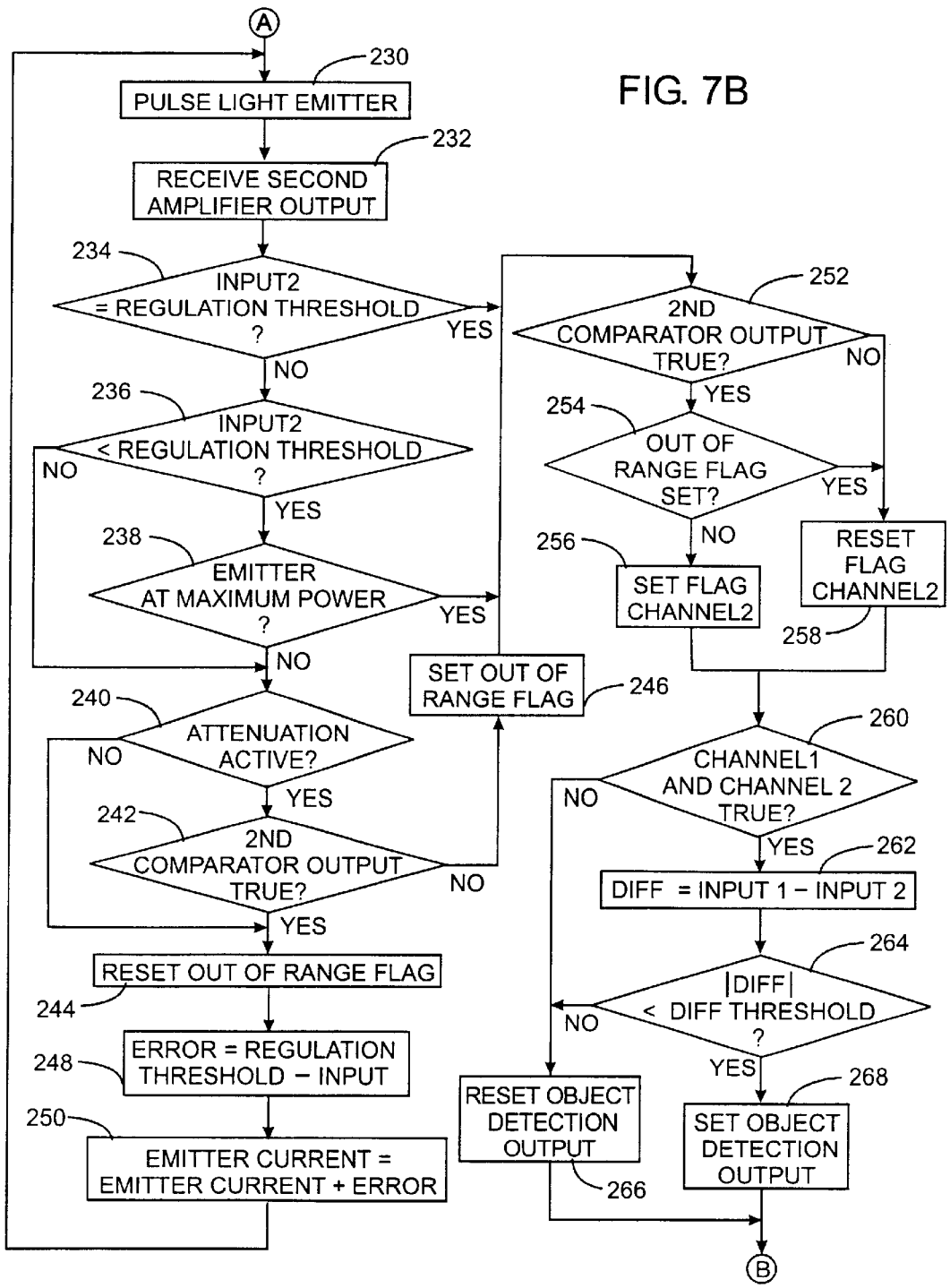

The program execution then advances to step 230 on FIG. 7B at which a similar automatic sensitivity control adjustment procedure is performed for second channel having the third and fourth photodetectors 148 and 149. In summary, the emitter 138 is activated to send a pulse of light and a second input signal is obtained at the microcomputer's second analog input 175 which input signal represents the third and fourth photodetector signals. Then at steps 234, 236 and 238 a determination is made whether to bypass the automatic sensitivity control for the second channel. In which case, the OUT OF RANGE flag may get set at step 246.

When the automatic sensitivity control process proceeds the OUT OF RANGE flag is reset at step 244. Then an ERROR value is calculated at step 248 by subtracting the analog input from the second amplifier 178 from the desired regulation threshold. That ERROR value is used at step 250 to adjust the emitter current level, which operates the current control circuit 140. This adjustment of the emitter current continues to be executed until either the emitter current is properly adjusted or can no longer be adjusted because the emitter is at maximum power. When that happens, the program execution advances to step 252.

The output of the second comparator 177 is inspected at this juncture. If that output is false, indicating that the third and fourth photodetectors 148 and 149 did not respond a valid object, a flag designated CHANNEL2 is reset at step 254. Otherwise, when the output of the second comparator 177 is true and the OUT OF RANGE flag is found set at step 256, the CHANNEL2 flag also is reset. If the OUT OF RANGE flag is not found set at step 256, a determination is made by the microcomputer 142 that a valid object may have been sensed by the third and fourth photodetectors, in which the case the CHANNEL2 flag is set at step 258.

At this point, signals from the two channels for the pairs of photodetectors 144–149 have been analyzed, the results of which are indicated by the CHANNEL1 and CHANNEL2 flags. Therefore, at step 260 the microcomputer checks whether the CHANNEL1 and CHANNEL2 flags are both true. If not, the program execution jumps to step 266 where the microcomputer output line 180 is reset to indicate that an object has not been detected. If at step 260 both the CHANNEL1 and CHANNEL2 flags are found to be true, the difference between the analog input levels from the first and second amplifiers 164 and 178 is derived at step 262. If these two analog inputs differ significantly, the validity of their indication of the presence of an object is questionable. Thus, at step 264 the absolute value of this difference is compared to a difference threshold. If that difference threshold is exceeded, the microcomputer 142 resets the object detection output line 180 at step 266. On the other hand, if the difference in the two input levels is less than the difference threshold, the microcomputer 142 concludes that an object is present on the conveyor and the object detection output line 180 is set true.

The automatic sensitivity control for the four photodetector object detection system 100 also is used in the first object detection system 36 in FIGS. 3 and 4 which has only three photodetectors. It is understood that the first object detection system 36 has only one analog input 65 and one digital line input 67 to the microcomputer 42.

What is claimed is:

1. An object detection system comprising:
   an emitter which produces a light beam for reflection by objects to be detected;
   a current control circuit includes an output terminal at which is produced an electric current that varies in magnitude in response to a first control signal, the emitter is connected to the output terminal;
   a photodetector receives light reflected by an object and produces a signal indicating an amount of light which strikes the photodetector;
   a variable attenuator is connected to the photodetector to attenuate the signal by an amount that varies in response to a second control signal, and produces an attenuated signal; and
   a controller responds to the signal produced by the photodetector by producing the first control signal and the second control signal.

2. The object detection system as recited in claim 1 wherein the variable attenuator comprises a field effect transistor coupled to the photodetector and having a gate to which the second control signal is applied.

3. The object detection system as recited in claim 1 wherein the variable attenuator comprises:
   a resistor connected in parallel with the photodetector; and
   a field effect transistor connected in parallel with the photodetector wherein the field effect transistor has a gate to which the second control signal is applied.

4. An object detection system comprising:
   an emitter which produces a light beam for reflection by objects to be detected;

current control circuit connected to the emitter and applying, to the emitter, an electric current that varies in magnitude in response to a first control signal;

a first photodetector producing a first signal which indicates an amount of light from the emitter that strikes the first photodetector upon reflection by an object;

a first input node to which the first photodetector is connected, a resistor connected in parallel with the first photodetector;

a transistor connected in parallel with the first photodetector and having a gate to which a second control signal is applied;

a first amplifier having an input connected to the first input node and having a first output; and a controller connected to the first output, and in response to a signal from the first amplifier producing the first control signal, the second control signal, and a detection signal indicating the presence of an object.

5. The object detection system as recited in claim 4 further comprising a second photodetector connected inversely in parallel with the first photodetector and producing a second signal which indicates an amount of light from the emitter that strikes the second photodetector upon reflection by an object.

6. The object detection system as recited in claim 5 further comprising:

a second input node;

a third photodetector connected to the second input node and producing a third signal which indicates an amount of light from the emitter that strikes the third photodetector upon reflection by an object;

a fourth photodetector connected inversely in parallel with the third photodetector and producing a fourth signal which indicates an amount of light from the emitter that upon reflection by an object strikes the fourth photodetector; and a second amplifier having an input connected to the second input node and having a second output;

wherein the detection signal, the first control signal, and the second control signal are produced by the controller connected further in response to a signal from the second amplifier.

7. A method for automatic sensitivity control of an object detection system having a light emitter and having a photodetector connected to a variable attenuator with an attenuation factor that varies in response to a control signal, said method comprising:

applying electric current at a predefined magnitude to the light emitter;

receiving a signal from the photodetector, the signal having a signal level;

deriving a difference between the signal level and a regulation threshold;

changing the predefined magnitude for the electric current in response to the difference; and changing the control signal to alter the attenuation factor, when the predefined magnitude has a given relationship to a threshold level.

8. The method as recited in claim 7 wherein the attenuator comprises a field effect transistor having a gate; and changing the control signal comprises altering a voltage level applied to the gate.

9. The method as recited in claim 7 wherein the object detection system is configured to ignore light reflected by objects located greater than a given distance from the emitter; and further comprising producing an indication of a specular object located beyond the given distance.

10. The method as recited in claim 9 wherein the indication is produced by determining whether the attenuation factor exceeds a given value; and if so, producing the indication when the signal level is less than a detection threshold.

11. The method as recited in claim 10 wherein changing the predefined magnitude for the electric current is inhibited in response to the indication.

12. The method as recited in claim 10 wherein applying electric current comprises applying a pulse of electric current to the light emitter.

13. The method as recited in claim 10 wherein changing the control signal to alter the attenuation factor, occurs when the predefined magnitude exceeds a threshold level.

14. The method as recited in claim 10 further comprising changing the predefined magnitude for the electric current upon changing the control signal to alter the attenuation factor.

* * * * *